United States Patent
Sarkar et al.

(10) Patent No.: US 7,716,254 B2
(45) Date of Patent: May 11, 2010

(54) SYSTEM FOR MODELING ARCHITECTURE FOR BUSINESS SYSTEMS AND METHODS THEREOF

(75) Inventors: Santonu Sarkar, Karnataka (IN); Srinivas Thonse, Karnataka (IN); Riaz Kapadia, Gujarat (IN)

(73) Assignee: Infosys Technologies Ltd., Bangalore (IN)

( * ) Notice: Subject to any disclaimer, the term of this patent is extended or adjusted under 35 U.S.C. 154(b) by 1071 days.

(21) Appl. No.: 11/224,914

(22) Filed: Sep. 12, 2005

(65) Prior Publication Data

US 2007/0061354 A1    Mar. 15, 2007

(51) Int. Cl.
  *G06F 7/00* (2006.01)
  *G06F 9/44* (2006.01)
(52) U.S. Cl. ...................... 707/803; 717/104
(58) Field of Classification Search .......... 707/102; 717/104

See application file for complete search history.

(56) References Cited

U.S. PATENT DOCUMENTS

| | | | |
|---|---|---|---|
| 6,636,242 B2 * | 10/2003 | Bowman-Amuah | 715/764 |
| 6,651,240 B1 * | 11/2003 | Yamamoto et al. | 717/108 |
| 6,957,186 B1 * | 10/2005 | Guheen et al. | 705/1 |
| 7,149,698 B2 * | 12/2006 | Guheen et al. | 705/1 |
| 7,181,493 B2 * | 2/2007 | English et al. | 709/204 |
| 7,430,498 B2 * | 9/2008 | Butterfield et al. | 703/2 |
| 7,472,374 B1 * | 12/2008 | Dillman et al. | 717/102 |
| 2002/0116545 A1 * | 8/2002 | Mandato et al. | 709/328 |
| 2003/0058277 A1 * | 3/2003 | Bowman-Amuah | 345/765 |
| 2004/0107125 A1 * | 6/2004 | Guheen et al. | 705/7 |
| 2005/0198618 A1 * | 9/2005 | Lalonde et al. | 717/110 |
| 2005/0216555 A1 * | 9/2005 | English et al. | 709/204 |
| 2006/0064178 A1 * | 3/2006 | Butterfield et al. | 700/18 |

OTHER PUBLICATIONS

Kruchten, "The 4+1 View Model of Architecture", Nov. 1995, IEEE, pp. 42-50.*
Losavio, Francisca, et al., "Comparison of EAI Frameworks", Journal of Object Technology, vol. 4, No. 4, May-Jun. 2005, pp. 93-104.*
Choi, Heeseok, et al., "An Approach to Software Architecture Evaluation with the 4+1 View Model of Architecture", APSEC '02, © 2002, pp. 286-293.*
Baida, Ziv, et al., "e-Business Cases Assessment: From Business Value to System Feasibility", International Journal of Web Engineering and Technology, vol. 1, Issue 1, Aug. 2003, pp. i-ii and 1-18.*

(Continued)

*Primary Examiner*—Robert Stevens
(74) *Attorney, Agent, or Firm*—Klarquist Sparkman, LLP

(57) ABSTRACT

A system and method for generating architecture for a business system is disclosed. The method comprises, in one embodiment, modeling a plurality of viewpoints adapted for describing the architecture of the business system in form of a collection of views and viewpoints and creating a software organization viewpoint adapted for providing architecture guidelines. An exemplary method further comprises creating a first plurality of notations for each of the plurality of viewpoints for describing the plurality of viewpoints and creating a second plurality of notations for capturing design rationale indicative of the first plurality of notations. Furthermore, an exemplary method comprises generating the architecture of the business system using at least one of the plurality of viewpoints or the software organization viewpoint, or at least the second plurality of notations, or combinations thereof.

17 Claims, 10 Drawing Sheets

OTHER PUBLICATIONS

Almeida, Joao, et al., "On the Notion of Abstract Platform in MDA Development", EDOC 2004, Sep. 20-24, 2004, pp. 253-263.*

Sarkar, Pradipta K., et al., "Aligning System Requirements with Stakeholder Concerns: Use of Case studies and Patterns to Capture Domain Expertise", AWRE 2002, © 2002, pp. 67-82.*

Fernandes, Kiran J., et al., "A Structured Modeling Approach to Object-Oriented Representation of Business Domains", Journal of Conceptual Modeling, Issue 16, Oct. 2000, pp. 1-17.*

Berkem, Birol, "Aligning IT with the Changes Using the Goal-Driven Development for UML and MDA", Journal of Object Technology, vol. 4, No. 5, Jul.-Aug. 2005, pp. 49-65.*

Le, Lam-Son, et al., "Definition of an Object-Oriented Modeling Language for Enterprise Architecture", HICSS '05, Jan. 3-6, 2005, pp. 1-10.*

Stojanovic, Zoran, et al., "Components and Viewpoints as Integrated Separations of Concerns in system Designing", Workshop on Identifying, separating and Verifying Concerns in the Design (held with AOSD-2002), Enschede, The Netherlands, © 2002, pp. 1-8.*

Kontio, Mikko, et al., "Architectural Manifesto: Designing Software Architectures, Part 5", IBM developerworks, Feb. 2, 2005, downloaded from www.ibm.com/developerworks/wireless/library/wi-arch11/, pp. 1-7.*

Solberg, Arnor, et al., "A Framework for QoS-Aware Model Transformation, Using a Pattern-Based Approach", CoopIS/DOA/ODBASE 2004, LNCS 3291, Springer-Verlag, Berlin, Germany, © 2004, pp. 1190-1207.*

Aagedal, Jan Øyvind, et al., "ODP-based QoS-support in UML", EDOC 1997, Gold Coast, Qld., Australia, Oct. 24-26, 1997, pp. 310-321.*

Kotonya, Gerald, et al., "Requirements Engineering with Viewpoints", Software Engineering Journal, vol. 11, Issue 1, Jan. 1996, pp. 5-18.*

Oivo, Markku, et al., "Representing Software Engineering Models: The TAME Goal Oriented Approach", IEEE Transactions on Software Engineering, vol. 18, Issue 10, Oct. 1992, pp. 886-898.*

Sarkar et al., "An Integrated Modeling Approach to Enterprise System Architecture," SETLabs Briefings, Oct.-Dec. 2004, 17 pages.

Sarkar et al., "EAML—Architecture Modeling Language for Enterprise Applications," IEEE International Conference on E-Commerce Technology for Dynamic E-Business, Sep. 13-15, 2004, 8 pages.

Bhat et al., "Methods for modeling flexibility in Business Processes," BPMDS '05 proceedings, Jun. 2005, 8 pages.

"IEEE Recommended Practice for Architectural Description of Software-Intensive Systems," IEEE Std 1471-2000, Oct. 9, 2000, 29 pages.

Krutchen, "The 4+1 View Model of Architecture," IEEE Software, Nov. 1995, 9 pages.

Vallecillo, RM-ODP: The ISO Reference Model for Open Distributed Processing, DINTEL Edition on Software Engineering. No. 3. ISBN: 84-931933-2-1, Mar. 2001, 7 pages.

Zachman framework, CIO Definitions, Mar. 22, 2004, 3 pages.

* cited by examiner

SYSTEM FOR MODELING ARCHITECTURE FOR BUSINESS SYSTEMS AND METHODS THEREOF

TECHNICAL FIELD

The disclosure relates generally to a business system and more particularly, to a method and system for modeling architecture for multiple business systems.

BACKGROUND

The design and development of an architecture for a business system typically begins with the definition of the goals and objectives of the business system.

A business system has a set of business goals and objectives to fulfill. The business system performs various business processes to fulfill these goals and objectives. The business process is an ordered series of events, which, among other things, manage the exchange of information from one or more sources to one or more destinations. Such sources and destinations may be internal, or external (e.g., customer, or partner applications), or both, and, in general, the business process is applied to control how the exchange of information is accomplished.

A large and complex business system performs multiple business processes across various geographical locations. A software implementation of such a business system automates these business processes for higher accuracy, efficiency and productivity. Accurate software implementation of such a business system requires the creation of the software architecture of the business system. The software architecture (also sometimes called architecture hereinafter) in this context is a specification that captures the structure and functionality of the software that implements the business system. The specification helps the various developers to understand and analyze different functional and quality of service aspects of the business system well before the software implementation of the business system.

Conventionally, the architecture description of a business system is captured using non-formal box and line diagrams with textual annotations. Such a description contains project and people specific idiosyncrasies. When the business system is very large and complex, it becomes extremely difficult for a reviewer to manually verify whether all of the requirements of the business system have been implemented in the architecture, and how each requirement has been implemented in the architecture, e.g., traceability of the requirements becomes very difficult. As a consequence, this informal box and diagram description approach often leads to ambiguity, misinterpretation and erroneous implementation when software developers implement the system from this description. This in turn, substantially increases the design and coding effort. As a result, higher productivity and development accuracy may not be achieved.

There have been many efforts from the researchers and practitioners of the art and science of architecture description to model various aspects of business architectures. Broadly there are two exemplary categories of languages recommended for architecture description, namely object oriented notations and languages such as the Universal Modeling Language (UML) and a class of Architecture Description Languages (ADL). There are a few prominent industry standards, such as 4+1 View, ISO RM-ODP 10746, Zachman framework, Institute of Electronics and Electrical Engineers (IEEE) 1471, that prescribe what an architecture should model. Though most ADLs are based on formal descriptions (which helps to verify and analyze the architecture models created using an ADL), there had been very little effort to standardize ADL. ADLs lack notations to capture the varying and comprehensive concepts of a business system such as the notion of architecture stakeholders, multiple views of a system, architecture rationale, and principles and so on. ISO RM-ODP prescribes a set of certain viewpoints required to describe the architecture at a very abstract level. ISO RM-ODP does not identify the views, architecture rationale and principles. Also, ISO RM-ODP does not describe how the architecture description may be handed off to a downstream development team for further implementation. The Zachman framework is subjective and not formal and has views that are generally not backed by notation.

While UML does allow some modeling of implementation details of an architecture, questions remain if UML 1.x is the right language for architecture description. For example, it has been argued that UML in its current form does not provide adequate support to describe an architecture as an interconnection of coarse grained components where it is possible to model hierarchical decomposition, various communication aspects, architecture styles, non-functional properties and where it is possible to perform a number of architectural analyses.

Accordingly, there is a need for an improved and standardized technique of modeling architecture for a business system.

SUMMARY

In one embodiment, a method for generating architecture for a business system is disclosed. The method of this embodiment comprises modeling a plurality of viewpoints adapted for describing the architecture of the business system in the form of a collection of views and creating a software organization viewpoint adapted for providing a design framework for the architecture. The embodiment further comprises creating a first plurality of notations for each of the plurality of viewpoints. Additionally, the embodiment comprises creating a second plurality of notations for capturing design rationale indicative of the first plurality of notations. Furthermore, the method of this embodiment includes generating the architecture of the business system using at least one of the plurality of viewpoints or the software organization viewpoint or at least the second plurality of notations, or combinations thereof.

In another embodiment, a computer implemented system adapted for generating and analyzing architecture for a business system is disclosed. The computer comprises at least one processor configured by software programs to generate the architecture. The software includes a user interface module adapted for capturing input from at least one user of the business system and a view and viewpoint module adapted for modeling a plurality of viewpoints, wherein each of the view and viewpoint modules includes a set of views adapted for describing the architecture of the business system. The view and viewpoint module in this embodiment includes a software organization module adapted for modeling software organization viewpoint and a first notation module adapted for creating a first plurality of notations for each of the plurality of viewpoints for describing the plurality of viewpoints. It should be noted that the system embodiment also is desirably also programmed by a second notation module adapted for creating a second plurality of notations for capturing design rationale indicative of the first plurality of notations and a storage module adapted for retrieving output from at least the view and viewpoint module to generate the architecture of the business system.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
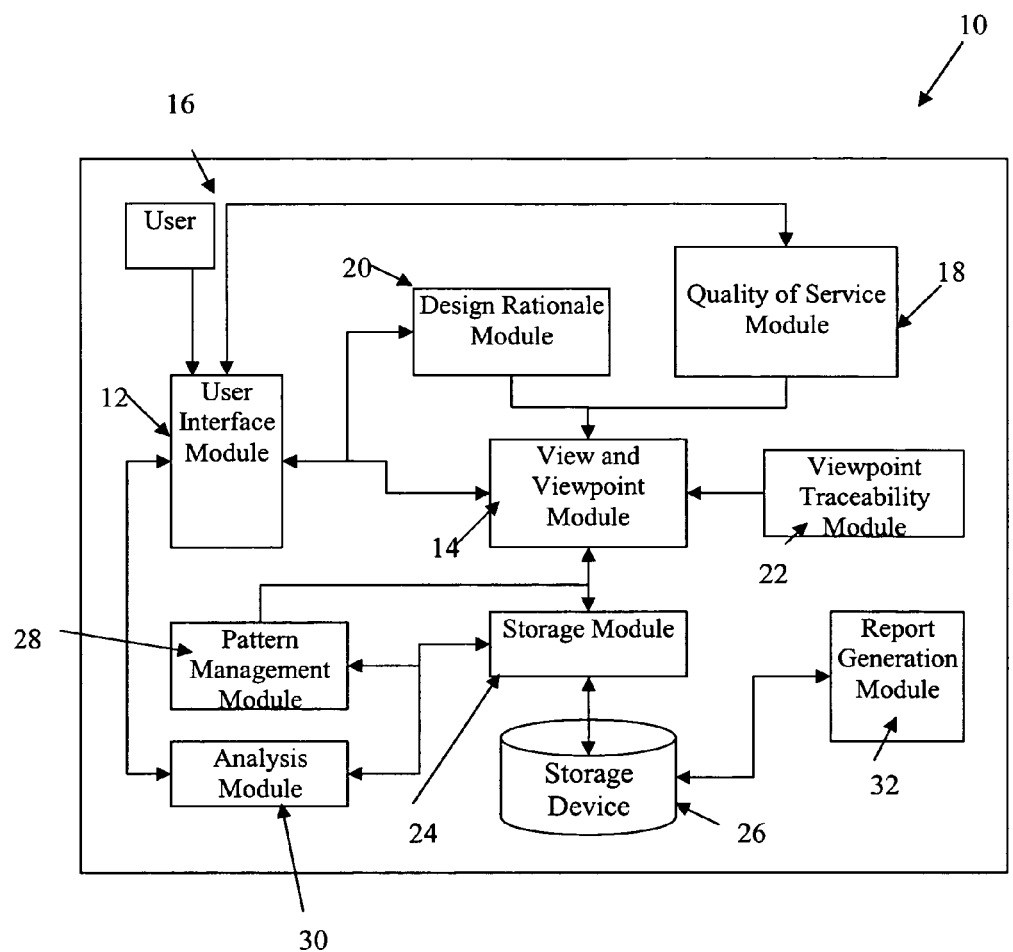
FIG. 1 illustrates an exemplary system for generating and analyzing the architecture for a business system, in accordance with one embodiment.

The following description is the full and informative description of the best method and system presently contemplated for carrying out the present invention which is known to the inventors at the time of filing the patent application. Of course, many modifications and adaptations will be apparent to those skilled in the relevant art in view of the following description and in view of the accompanying drawings and the appended claims. While the system and method described herein are provided with a certain degree of specificity, embodiments may be implemented with either greater or lesser specificity, depending upon the needs of the user. Further, some of the features of the present technique can be used to obtain an advantage without the corresponding use of other features described in the following paragraphs. As such, the present description should be considered as merely illustrative of the principles of the present disclosure and not in limitation thereof, since the present technique is defined solely by the claims.

The present disclosure relates to a computer implemented system and method for modeling the architecture for a business system. The system desirably creates an architecture model to describe the architecture of a software intensive system in a formal way. The model is suitable for the business system that implements business applications. Business applications are typically a collection of software programs that automate a set of business processes for a business domain, namely automobile, telecom, retail, banking, and healthcare and so on. As will be appreciated by people skilled in the art, to best understand the present invention, it is important to be familiar with the environment and the basic terminologies.

A business system, pertaining to at least one business domain, often has a set of pre-defined business goals and objectives. By way of example, a business domain can include at least one of finance, or manufacturing, or suppliers, or information technology, or marketing, or administration or customer support, or combinations thereof. The business system performs various business processes and sub-processes to achieve these business goals and objectives. A business process can be represented as an ordered series of events, which manage changing of information from one or more sources to one or more destinations. Such sources and destinations can be internal or external (e.g., customer or partner applications, or both). A business system can be applied to control how the change of information is accomplished. The business system includes multiple internal business sub-systems and typically interacts with multiple external systems. They individually perform parts of business processes and sub-processes and collectively achieve the business goal.

It should be noted that, for purposes of the implementation of the disclosed approaches, the business system desirably encompasses individual applications, systems in the traditional sense, subsystems, and systems of systems, product lines, product families, businesses, and other aggregations of interest. A business system inhabits an environment. The business system's environment can influence the business system. The environment or context can determine the setting and circumstances of developmental, operational, and other influences upon that business system. The environment can include other systems that interact with the system of interest, either directly via interfaces or indirectly in other ways. The environment desirably determines the boundaries that define the scope of the system of interest relative to other business systems.

A typical business system has one or more stakeholders. Each stakeholder typically has interests in, or concerns relative to the business system. Concerns are those interests which pertain to the system's development, its operation or any other aspects that are critical or otherwise important to one or more stakeholders. Concerns include system considerations, such as functionality of the system and various quality of service (QoS) attributes such as performance, reliability, security, distribution, manageability and so on.

The architecture of the business system can be defined by the recommended practice as the fundamental organization of the business system, embodied in its components. The architecture desirably includes the relationships of components to each other and the environment, and the principles governing its design and evolution. The architecture can be recorded by an architectural description. The architectural description elaborates how various concerns of the business system stakeholders have been addressed.

The architecture description of a software intensive system desirably addresses the diverse set of stakeholder's concerns. Due to the diversity of the stakeholders concerns, the architecture may not be described in a one-dimensional way. Desirably, the architecture description is organized into a collection of views, where each view describes the architecture of the system from a specific perspective. Such a view is desirably described using a set of architecture modeling notations and desirably addresses one or more of the concerns of the system stakeholders.

A viewpoint desirably establishes the conventions to create, use and analyze at least one view. In this way, one or more views conform to a viewpoint. The viewpoint desirably determines the languages (including notations, model, or product types) to be used to describe the view, and any associated modeling methods or analysis techniques to be applied to these representations of the view.

As mentioned earlier, a typical business system comprises a collection of applications that automate a set of business processes. Some of these applications have been developed over time and can be deployed in distributed locations. Some of these applications may need to be developed from the scratch and need to be integrated with the existing applications. Each of these applications and the overall business system has several quality-of-service (QoS) requirements, such as performance, security, reliability, maintainability and so on, that have to be fulfilled. The architecture of such a business system desirably has the capacity to model these characteristics. Identifying the appropriate set of formal notations to describe these architecture aspects is a challenge. For this purpose, an exemplary approach defines an architecture that addresses the needs of business systems via multiple notations and sets of views (desirably expressed as diagrams) that uses these notations to describe the architecture.

In accordance with one embodiment, a meta-model based approach has been adopted to formally describe the architecture of a business system. In this context, a meta-model is a computer understandable abstract language used to describe various types of information related to the architecture of a business system. By the way of example, suppose that an on-line banking system has one (or more) hundred different "software components" that "interact" among themselves to accomplish the functionality of the banking system. Next, suppose that these components work on various domain entities like "Account", "Customer", "Interest calculation" and so on. Also suppose that these software components "run" on ten different "hardware components" which have been "interconnected" in a specific manner. In order to define the architecture of this banking system, it is desirable to describe how the one (or more) hundred software components interact; how these components work on domain entities such as Account, Customer; how these components run on ten hardware components; and how the hardware components have been interconnected. In this example, the exemplary meta-model is an abstract language consisting of notations to describe a software component, an interaction among software components, a domain entity, interaction of a software component with a domain entity, a hardware component, running of a software component on a hardware component, interconnection of hardware components and so on.

In one specific example, the meta-model notations for architecture description has the following exemplary characteristics. In one exemplary embodiment, the meta-model notations have been identified based on the mental model and vocabulary of people skilled in the art, thereby making it easy for the people reasonably skilled in the art to grasp the meta-model fast and to perform architecture modeling quickly. The meta-model notations clearly describe various views and viewpoints. In another exemplary embodiment, the meta-model provides explicit notations to capture various quality-of-service (QoS) requirements and to associate the QoS requirements to various parts of the architecture description. In yet another exemplary embodiment, the meta-model provides notations to capture design rationale, architecture decisions and to associate them with various views and viewpoints. Furthermore, in another exemplary embodiment, the meta-model allows the architect to ensure traceability as described in subsequent sections. In yet another exemplary embodiment, the meta-model unambiguously specifies the hand off point from the architecture to the design and implementation phase which makes it possible for many if not all design systems to read the output of the architecture modeling system for downstream design and implementation. One or more of the above aspects can be combined. It should be noted that the notations associated with the meta-model are extendible dynamically. Based on the modeling complexity of the business system, one can add new notations and their semantics without significantly changing the software system.

Referring now to the figures, FIG. 1 illustrates an exemplary computer software system 10 comprising at least one processor programmed with software (computer implemented instructions) to configure one or more computer processors for generating and analyzing architecture for a business system, in accordance with an embodiment of the present technique. The system 10 desirably includes user interface module 12 and a view and viewpoint module 14. The user 16 of the business system can provide the input through the user interface module 12. It should be noted that in one implementation, the user interface module 12 can be a graphical user interface. The view and the viewpoint module 14 can be adapted for modeling multiple viewpoints, wherein each of the viewpoints includes a set of views adapted for describing the architecture of the business system. The details of an exemplary view and the viewpoint module 14 will be explained in detail with reference to FIG. 2. The illustrated system 10 further includes a quality-of-service (QoS) module 18, which can be linked with the user interface module 12 and also can be adapted to capture certain QoS attributes.

The QoS attributes can include security, performance, scalability, maintainability, availability and portability among others. The QoS attributes are desirably captured in parallel with other functional specifications. The functional specifications desirably describe how the overall system functionality has been distributed among various components and how they interact among themselves to realize the functionality. These aspects are desirably considered and incorporated during architecture definition so that the development team can implement the QoS aspects during the implementation of the system.

The illustrated system 10 desirably also includes a design rationale module 20 and a viewpoint traceability module 22. The design rationale module 20 can provide a prescriptive approach to define architecture principles, architecture decision, and architecture rationale by defining design rationale notations and explicit modeling constructs. Furthermore, the module desirably allows an architecture decision to be linked with one or more architecture rationale, which in turn can be based on architecture principles. In one embodiment, the design traceability module 22 can be used to capture the influence of the multiple viewpoints on the business system.

This formal approach of capturing design rationale allows the user 16 to unambiguously explain (e.g., via notations that are captured and stored) why certain design decisions have been taken and their merits/demerits. This in turn helps the downstream design team and other stakeholders to understand, and more accurately translate, the architecture into an implementation. The viewpoint traceability module 22 desirably guides the user 16 to capture architecture models so as to become traceable to the requirement (upstream) and design (downstream). In other words, the viewpoint level traceability provides traceability among the views and viewpoints. In one embodiment, the module 22 allows modeling elements like business process activities, tasks and use cases to be linked with modeling elements like business systems and subsystems. In another embodiment, the module 22 links a modeling elements, such as, for example, the modeling element "Domain entity" with another modeling element—"Use case". In the present context, Use case of a business system describes an identifiable and externally observable service performed by the system when initiated by one or more actors. The Use case is often specified as a sequence of dialogs with these actors. For example, "Change the contact address of a user" may be a Use case of an on-line Banking system. In this context, an actor is a human user or some other external system that interacts with the business system under consideration. Likewise, a "Domain entity" represents, in this embodiment, a concept pertaining to the business domain as explained earlier. A concept can be an abstract entity, important business domain specific rule, algorithms or combinations thereof. By way of example, in the business domain of Banking, a domain entity can be "Account", "Payroll", "Loan", "Interest calculation" and so on. The information associated with the domain entity often needs to persist in the database, directory system or any other non-volatile storage.

In yet another embodiment, the module 22 maintains a relationship between a system (subsystem) and domain entity to capture the influence of a functional entity (system or subsystem) on the lifecycle of a business system. A sample set of traceability can be at least one of, but not limited to, how business processes can be realized using subsystems, how domain entity lifecycles are controlled by subsystems, how subsystems can be implemented using technology, how subsystems can be deployed in the hardware infrastructure, or how subsystems can be implemented as packages or combinations thereof. Though reference is made to the above mentioned modeling elements such as system, subsystem, Use case, Domain entity, as will be appreciated by person skilled in the art, many such similar elements and their traceability can also be implemented using these approaches.

The illustrated FIG. 1 system desirably further includes a storage module 24 and a storage device 26. The storage module 24 can be adapted to generate and store the architecture description of a business system in a non-volatile storage media. For example, a non-volatile storage media can be magnetic disk, optical disk (such as a CD-ROM or other optical media). Other exemplary types of non-volatile storage media which can store the architecture description are magnetic cassettes, flash memory cards, digital video disks, CDs, DVDs, RAMs, ROMs, and the like. In one embodiment, the storage module 24 stores the architecture description in the non-volatile storage as a collection of files where each file will contain a part of the architecture described using architecture meta-model specific data-structures. The storage module 24 can also be responsible for reading these files from the non-volatile storage media and reconstructing the architecture meta-model specific data structures. These data structures can be used by other modules of the system 10.

The illustrated system 10 further includes a pattern management module 28 adapted to create the architecture of a business system in a faster manner by instantiating and assembling already available patterns together. A pattern is a re-usable generalized solution to a problem. A pattern captures a successful solution to a repeating problem in a particular context. In one embodiment, a pattern can be a template (a partially complete part) of a view. For example, a pattern can consist of a set of functional components and their interaction to accomplish one or more certain tasks. This template is desirably created from the architecture of a previously implemented system. The template exists in a generalized form so that it can be reused. If one particular view of the current business system architecture is similar to an existing template, the pattern management module 28 retrieves the template from the storage and instantiates the template by changing certain parameters of the template so that the template fits into or applies to the current business system. In one embodiment, the pattern management module 28 interacts with the user through the user interface module by presenting several questions pertaining to a particular view and searches for the right template from a pattern repository (not shown for clarity). When the user 16 selects a template from the search result, the exemplary pattern management module 28 partially creates the view associated with the template and allows the user 16 to complete the view.

Referring back to FIG. 1, the system 10 desirably includes an analysis module 30 adapted to perform various analysis of the architecture of the business system, which has already been created from the view and viewpoint module. In one embodiment, the analysis module 30 can retrieve the architecture description through the storage module 24 and perform analysis. In another embodiment, the analysis module 30 can take the output of the view and viewpoint module 14 to perform various analyses.

The system 10 also desirably includes a report generation module 32 adapted to generate the architecture document and various traceability analysis reports during implementation of the architecture. As will be appreciated by those skilled in the art, in one embodiment, the final output of the architecture can be displayed in the user interface 12. In another embodiment, the final architecture can be generated as a report by reading the architecture description created by the view and viewpoint module 14. The report generation module 32 can store the report in the non-volatile storage through the storage module 24. In yet another embodiment, the report generation module 32 can interact with the analysis module 30 to obtain the analysis data on a given architecture description. It should be noted that since the meta-model notations as described earlier, are extendible, it is possible to add new notations and traceability information as desired and, as a result, new types of traceability reports can also be generated by extending the report generation module 32.

Figure 2:
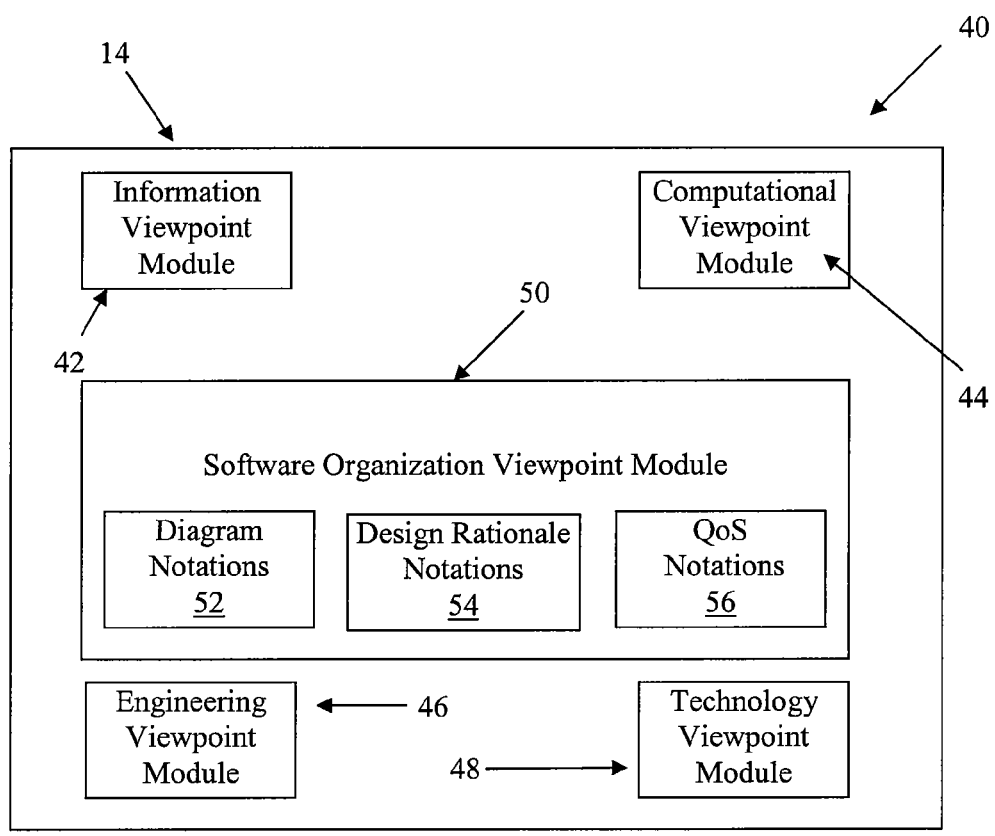
FIG. 2 depicts a system illustrating exemplary components of the view and the viewpoint creation module of FIG. 1 in greater detail and with an embodiment.

FIG. 2 depicts a system 40 illustrating in greater detail the components of an exemplary view and the viewpoint creation module 14 of FIG. 1, in accordance with an embodiment. The viewpoints in the exemplary view and viewpoint module 14 are adapted for describing the architecture of the business system in form of a collection of views. The view and the viewpoint module 14 desirably include multiple viewpoint modules. Each viewpoint module comprises multiple notations, which describe the views (also called diagrams). The illustrated module 14 as depicted in FIG. 2 includes an information viewpoint module 42, a computational viewpoint module 44, an engineering viewpoint module 46, a technology viewpoint module 48 and a software organization viewpoint module 50. Each of the above viewpoints will be explained in detail in the sections to follow. As mentioned earlier, an exemplary viewpoint establishes the conventions by which a view is created, depicted and analyzed.

The computational viewpoint module 44 can be concerned with the functional decomposition of the business system into a set of functional elements that interact at interfaces, realizing business system functionality. For example consider a "Billing Mgmt" business system consisting of functional elements such as Customer Management, Account Management, Tariff Management, Invoicing and so on. These elements interact with each other to perform the intended functionality of the "Billing Mgmt" business system. The module 44 includes several context and functional diagrams. The context diagram can be used to define the system boundary and scope of work. This in turn helps the user to define the environment aspect of the architecture. The functional diagram can be used to capture the functional decomposition of the system and subsystems which are within the scope of the work.

The information viewpoint module 42 can be concerned with the kinds of information handled by the business system and constraints on the use and interpretation of that information. In the Information viewpoint module, the user can define several entity organization, entity relationship and entity life-cycle diagrams. These diagrams are used to capture high level domain entities, their relationships and their lifecycle. The domain entities can be derived from the messages communicated among the subsystems identified in the computational viewpoint module 44 and the work products identified in the business processes associated with the business system.

Referring back to FIG. 2, the engineering viewpoint module 46 can be concerned with how a business system is implemented and the infrastructure required to support system distribution. Here, the user desirably can define the realization of functional elements using architecture services, architecture styles and communication details. In this viewpoint module, the user can also define several logical diagrams. The technology specific aspects of architecture can be captured through these logical diagrams. An exemplary logical diagram describes how the functional elements and domain entities can be implemented in terms of the implementation platform and architecture styles, interaction protocols, the commercial off-the-shelf (COTS) products such as application middleware, functional products etc. The functional elements and domain concepts can be distributed across multiple tiers, where each tier offers one or more architecture services. The tier in this context can represent a run-time aspect of the business system. At least one software component can be placed in each tier and the tier can be deployed in a computer or a virtual machine at run time. By way of example, the implementation platform can represent the operating system, the run-time operational environment such as Java virtual machine, Microsoft NET run-time environment, CORBA (Common Object Request Broker Architecture) run-time environment and the like. An architecture style in this context represents a possible deployment and run-time interaction of functional elements on the implementation platform. An example of an architecture style can be multi-tier architecture. An architecture service in the present context can be a utility and infrastructure service to support the implementation of business system functionality.

The technology viewpoint module 48 of FIG. 2 consists of several application diagrams and deployment diagrams. These diagrams capture runtime deployment of the system involving the software products and hardware components. The application diagram captures the software products and infrastructure required to implement the system. The deployment diagram describes the hardware nodes and their distributions to host the business system. The deployment diagram can capture the type and location of hardware nodes, connections, network topology, and distribution of hardware components across the geography of the organization in order to achieve the required service-level characteristics (performance, availability, etc.).

Referring back to FIG. 2, the software organization viewpoint module 50 of the system 40 desirably describes in detail how the system will be implemented by the software developers. Module 50 desirably describes principles and standards for adoption by the design teams and the release and configuration management guidelines. In the present context, the principles and standards can also be collectively referred as a design framework for describing the architecture. The software organization viewpoint module 50 can be considered as the handoff from the architecture to the development team and helps the project manager obtain an estimation of the development effort and plan. The software organization viewpoint module 50 desirably consists of a package diagram comprising or consisting of the decomposition of components into package units arranged in layers and their inter-dependencies. A package unit is an atomic unit of software that offers a specific functionality. These packages form the foundation of lower level design. All the package units are combined together to provide the intended functionality of the business system. A developer is responsible for the detailed design and implementation of one of more package units. The package diagram assists a project manager to allocate implementation tasks. The package units are desirably layered in a stack to indicate the order in which these packages should be implemented. As an example, the packages in the lower layer are implemented and tested first before implementing and testing the packages in the upper layer. The layering of the package units in this diagram assists the developer to detect the cyclic dependency among the package units and therein removal them before proceeding towards implementation. The packages identified in the software organization viewpoint can be directly exported as UML packages for downstream design.

The software organization viewpoint module 50 further includes, in one embodiment, at least one realization diagram to capture the interaction of package units to realize some useful scenarios, such as how a QoS requirement may be realized. Furthermore, module 50 desirably includes at least one development configuration diagram, which provides a detailed view of the structure in the development environment (directory structure). This diagram helps the project manager and other stakeholders to maintain the source code of these packages during implementation. Lastly, the exemplary module 50 desirably includes at least one load-build configuration diagram, which provides a view of deployable units of the system linked to these package units. The purpose of the load-build configuration diagram is to provide the load-build team with inputs for designing the load-build structure. Load-build is a process of creating installable files through compilation and linking of software programs. Programs are compiled into packages and then into deployable units. The load-build configuration diagram represents links between deployable units and packages. Each deployable unit is linked to packages that it is composed of.

Each viewpoint module comprises a number of notations. By way of example, the software organization viewpoint module 50 can include a first plurality of notations 52 which describe the diagrams (i.e. views) of the viewpoints. The module 50 further can include a second plurality of notations 54 for capturing the design rationale indicative of the first plurality of notations. Likewise, the viewpoint module 50 can also include a third plurality of notations 56 adapted to associate quality of service attributes to at least one of the plurality of viewpoints, or to the first plurality of notations, or to the second plurality of notations, or to combinations thereof. As will be appreciated by a person skilled in the art, though reference is made to the plurality of notations in the software organization viewpoint module 50, this is also applicable for the rest of the viewpoint modules (42, 44, 46, and 48). It should also be noted that the above mentioned notations can be implemented outside a viewpoint module. By way of example, the second plurality of notations 54 can be implemented in the design rationale module shown in FIG. 1 and the third plurality of notations 56 can be implemented in the QoS module shown in FIG. 1.

By way of example, the computational and the information viewpoint notations can capture the functional and the information aspects of the architecture description respectively. In one exemplary implementation, the software system 40 introduces the concept of system, subsystem, and application service, to model the functional aspect of a business system. By way of an exemplary example, notations such as "System", "Subsystem", and "Actor" can be used to describe a functional diagram, under a computational viewpoint. Using other notations, the user can perform a hierarchical decomposition of a "System". The hierarchical decomposition allows the "System", and the "Subsystem" to have containment relationships for facilitating modeling of coarse grained functionality of the system and decomposing the functionality into fine grained subsystems. Likewise, in another exemplary example, notations such as "Entity Group", "DomainEntity", "Aggregation", "Association" can be used to describe a domain analysis diagram under information viewpoint. Though reference has been made to the above mentioned viewpoint notations, as will be appreciated by a person skilled in the art, many such similar notations can be implemented.

Traceability of functional aspects with information can be done by maintaining a "Create-Read-Update-Delete" (CRUD) relationship between the "System" (or a "Subsystem") notation and "DomainEntity" notation to capture the influence a functional element (system or subsystem) has on the lifecycle of a business concept. Secondly, traceability of information aspects with business aspects can be done by deriving traceability from business concepts. In order to establish the traceability, in one embodiment, the system links the notation "DomainEntity" with the notation "UseCase". Lastly, the traceability among business processes and requirements, functional services and business concepts can also be done using these techniques. Though reference has been made to the above mentioned traceability, as will be appreciated by a person skilled in the art, other traceability among the notations can be implemented using the present techniques.

As described earlier, the logical diagram describes how the functional elements and domain entities desirably can be implemented using platforms, architecture styles, and interaction protocols. In one implementation, the software system introduces the concept of "Architecture Service", "Tier", "Architecture Component", "Protocol", "Connector", "Application Component" as notations to describe the logical diagram. Though specific reference has been made to the above mentioned notations, as will be appreciated by a person skilled in the art, other such similar notations can be implemented using the above techniques.

Likewise there can be several possible notations for other viewpoints. In an exemplary example, the software organization viewpoint module 50 can have notations such as "Package unit", "Configuration Structure", "Build unit", "Layer" and so on. Furthermore, the notation "Package unit" can be linked to notations such as "Subsystem" or "DomainEntity". This helps in establishing the traceability of detailed design with the architecture. Though reference has been made to the above mentioned traceability, as will be appreciated by a person skilled in the art, other such traceabilities can be implemented using the present technique to facilitate downstream implementation of the business system.

The third plurality of notations 56, namely QoS attributes can capture QoS requirements and associate the QoS requirements with one or more of the first plurality of notations 52 that describe view and viewpoints. In an exemplary example, a QoS attribute notation can be "Maintainability", "Performance", "Availability" and so on. The "DomainEntity" notation can be linked to the "Maintainability" requirement by associating the "DomainEntity" with various storage requirements, such as growth, size, or purge / archival frequency. In another exemplary example, the notation "HardwareNode" can be associated with an "Availability" requirement, such as the "HardwareNode" should be 99.9% available.

In another exemplary example, there is desirably specific second plurality of notations 54 to capture design rationale notations such as "Mission", "Architecture principle", "Architecture Decision", "Architecture options", among others.

By way of example, entities in a specific architecture diagram have been identified based on certain design rationale. For instance, commercial off-the-shelf (COTS) products in an application diagram can be selected based on evaluation criteria. The clustering of the devices in the deployment diagram can be done to satisfy certain QoS requirements. The domain analysis diagram can be influenced by some architecture principles. The decision to break up a system into a set of subsystems can also be based on certain design rationale. The first plurality of notations 52 associated with a diagram desirably has the capability to capture such rationale behind the diagram, such as in the exemplary manner described below.

The notation 'ArchitectureDecision' can be linked with every diagram. This helps the user to capture the overall justification behind creating a particular diagram. Secondly, the notation 'ArchitectureDecision' can also be linked to a particular notation (for instance "Subsystem", "DomainEntity", and so on) in the diagram to capture more fine grained design decisions. Thirdly, the notations "ArchitectureDecision" can be linked with the notation "Architecture Principle", which establishes the reasoning for a particular Architecture decision. This linking helps the user to trace how an architecture principle can influence an architecture decision.

Since the traceability information is integrated with various notations, the report generation module shown in FIG. 1 can collect the traceability information from all the notations and generate a traceability report.

Figure 3:
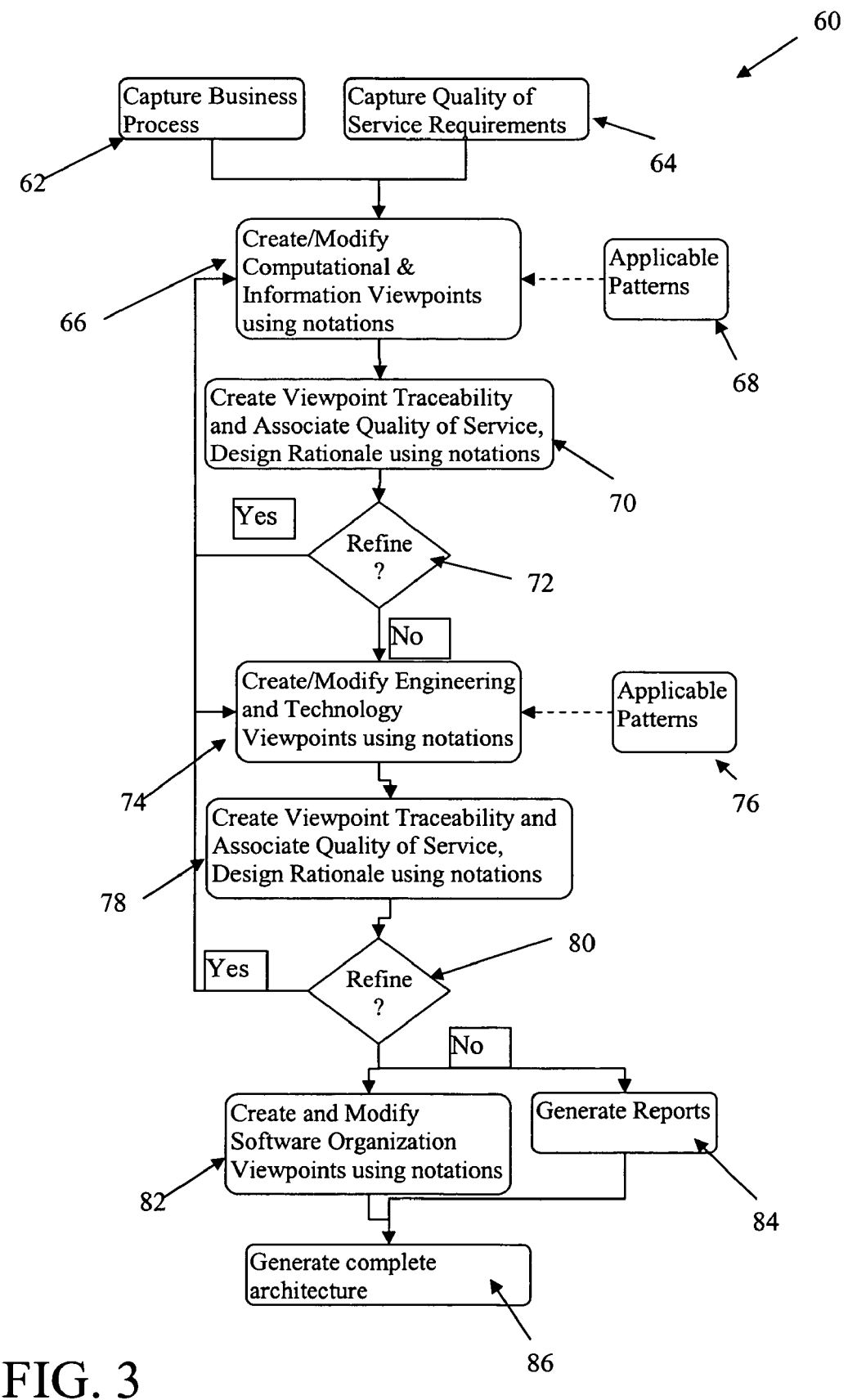
FIG. 3 is a flowchart illustrating an exemplary method for generating the architecture for a business system, in accordance with an aspect of an illustrated embodiment.

FIG. 3 is a flowchart illustrating an exemplary method 60 for generating an architecture for a business system, in accordance with an aspect of the present technique. The method 60 starts at step 62 by capturing the business process of the business system and capturing the QoS requirements that the business system are expected to satisfy (block 64). The method 60 follows in step 66 by creating/modifying computational and information viewpoints. As explained earlier, the computational and the information viewpoints desirably capture the functional and the information aspects respectively. In one embodiment of the present technique, a method of expressing the computational viewpoint through context diagrams and functional diagrams providing requirements traceability can be provided. This can be done by using at least one of the first plurality of notations for the computational viewpoint to demarcate a business system boundary, or to perform business system decomposition, or to associate a system/subsystem with business process activities providing traceability, or to associate a system/sub-system with functional services, or combinations thereof.

In another embodiment of the present technique, a method of expressing the information viewpoint through domain analysis and entity lifecycle diagrams can be executed using the first plurality of notations for the information viewpoint. Steps for doing this latter method can include grouping domain entity to domain entity groups, associating domain entity to business location, associating entity to application-service through the "Create-Read-Update-Delete" (CRUD) relationship, associating domain entity with various storage requirements, such as growth, size, or purge / archival requirements.

The computational and information viewpoint creation (block 66) can be expedited using applicable patterns (block 68) available in the pattern repository. The pattern management module retrieves the most appropriate pattern and partially creates the computation and/or information viewpoint diagrams as appropriate.

At step 70, the viewpoint traceability is created and the QoS attributes are mapped to the viewpoints. At this step the design rationale can be associated using second plurality of notations and the rationale can be linked with the viewpoints. The method 60 continues in step 72, where a decision can be made to either refine the computational and information viewpoint or move to the next step of creating/modifying engineering and technology viewpoints.

In one implementation of the present technique, a method of creating engineering viewpoint and technology viewpoint (block 74) through logical diagrams is disclosed. The method can include expressing logical diagrams as application components that use services of the architecture using the first plurality of notations for the engineering viewpoint. In addition to this, the method can include identifying architecture components to describe infrastructure utility components such as databases, middleware, directories, identifying application components that describes logical components of system, and organizing application and architecture components into tiers as described earlier. Furthermore, the method can also include associating application services to application components, associating architecture services to architecture components, tracing application services to performance requirements (e.g., response time).

With regard to the technology viewpoint, in certain implementations of the present technique, a method of expressing the technology viewpoint through application and deployment diagrams is disclosed. The method can include: associating application and architecture components to their deployment hosts, namely, for example, deployable units, application server, web server, database server; associating operating environment (OS) to devices; associating deployable units to the operating environment; and generating interactions among deployable units from interactions among application and architecture components using the first plurality of notations for the technology viewpoint.

Likewise, as described earlier, technology and engineering viewpoint creation can be expedited using applicable patterns (block 76) available in a pattern repository.

At step 78, the viewpoint traceability can be created and the QoS attributes can be mapped to the viewpoints. At this step 78, it is possible to associate design rationale using a second plurality of notations and to link the rationale with the associated viewpoints. The method 60 continues in step 80, where a decision can be made to either refine the technology and engineering viewpoint, or refine the computational and information viewpoint, or to move to the next step of creating/modifying software organization viewpoints (block 82).

The method 60 continues at step 82, wherein in certain implementations of the present technique, a method of expressing the software organization viewpoint, such as through one or more package diagrams, realization diagrams, development configuration diagrams and load-build configuration diagrams using the first plurality of notations for the software organization viewpoint, takes place. The package diagram desirably consists of a decomposition of components into package units arranged in layers and their inter-dependencies. The realization diagram desirably captures the interaction of package units to realize some useful scenarios such as how a QoS requirement may be realized. The development configuration diagram desirably provides a detailed view of the structure in the development environment (directory structure). The load-build configuration diagram desirably captures a view of deployable units of the system linked to these package units.

The method 60 continues at step 84, wherein in certain implementations of the present technique, the generation of reports of various architecture analysis takes place. The report generation is performed by a report generation module, such as shown in FIG. 1. This step 84 desirably is executed after the computational, information, engineering and technology viewpoints have been described. As described earlier, the reports can include at least one of the following reports: architecture-cost, total development effort and plan, activity to system-subsystem matrix, CRUD analysis, application-component, architecture-component to package unit matrix, application-component to system-subsystem matrix, application-service to system-subsystem matrix, devices-to-deployable-unit-COTS matrix, hardware-boxes report matrix, QoS traceability matrix among others, or combinations thereof.

In one embodiment, the architecture-cost report can be generated by evaluating multiple versions of application and deployment diagrams on the basis of the costs of the COTS product and hardware infrastructure used in a version. The total development effort and plan can be created from the package units, the load-build configuration diagram of the software organization viewpoint can also be developed. The other reports such as activity-to-subsystem matrix, CRUD analysis report, and application component-architecture component to package unit matrix, application-service to system-subsystem matrix, devices-to-deployable-unit-COTS matrix, hardware-boxes report matrix, QoS traceability matrix can also be generated by analyzing different traceability information.

The method continues at step 86, wherein the complete architecture is generated by creating a system architecture document containing a description of each diagram, design rationale, QoS and viewpoint traceability, and various analysis reports. In one embodiment of the present technique, all the outputs generated by the viewpoints, including reports, documents and internal data structures for architecture meta-model can be stored in a storage device. The architecture generation and storing is desirably performed by the storage module. It may be noted that, though architecture generation and report generation steps have been shown at the end, the system can generate a partial architecture at any stage of architecture creation and that it is possible to perform an analysis of the architecture during any stage. Whenever any analysis needs to be executed, the meta-model data can be retrieved from the storage module for performing the required analysis.

Figure 4:
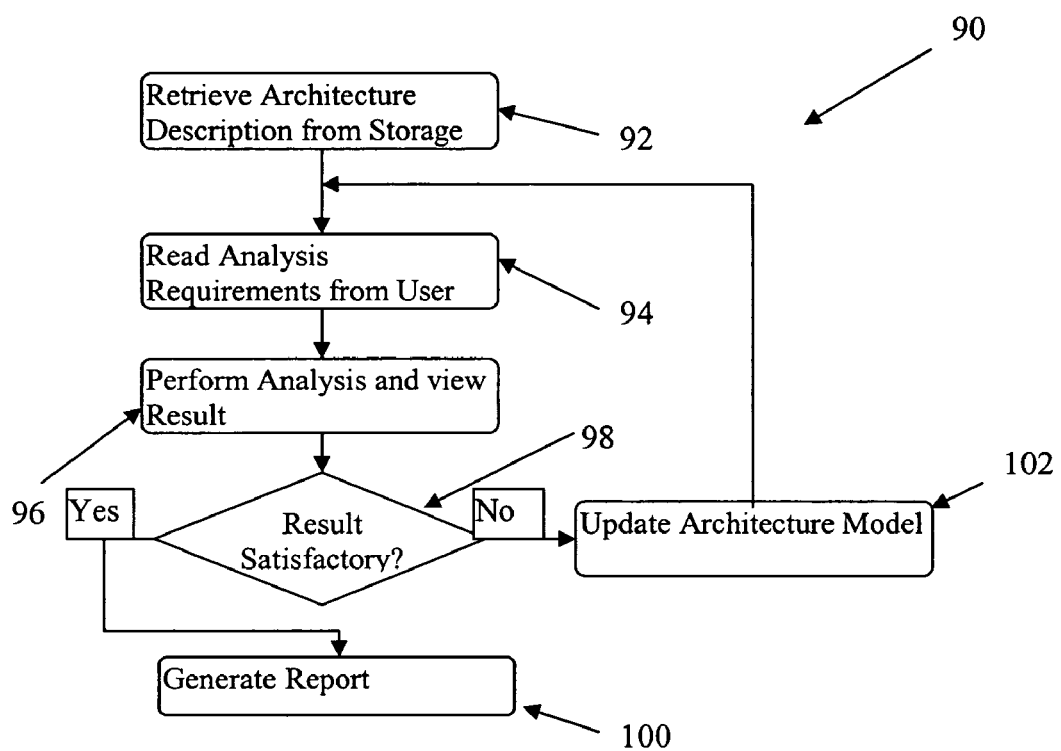
FIG. 4 is a flowchart illustrating an exemplary method of performing various analyses as described in FIG. 3, in accordance with an aspect of an illustrated embodiment.

FIG. 4 is a flow chart illustrating an exemplary method 90 of performing various analyses as described in FIG. 3, in accordance with an aspect of the present technique. The method 90 involves retrieving architecture from the storage module at step 92. The method 90 further includes reading analysis requirements from the user and performing analysis and generating results (block 94). It should be noted that, in certain implementations of the present technique, the result can be directly sent to the user interface. The results are then verified at step 96. If the results are satisfactory (at block 98), a report can be generated (block 100). In the event the results are not satisfactory, the generated architecture can be updated based on the results of the analysis (block 102) and then the report can be generated again.

As will be appreciated by those skilled in the art, though reference is made to the above mentioned methods of analyzing, other similar methods can also be used with the present technique.

Figure 5:
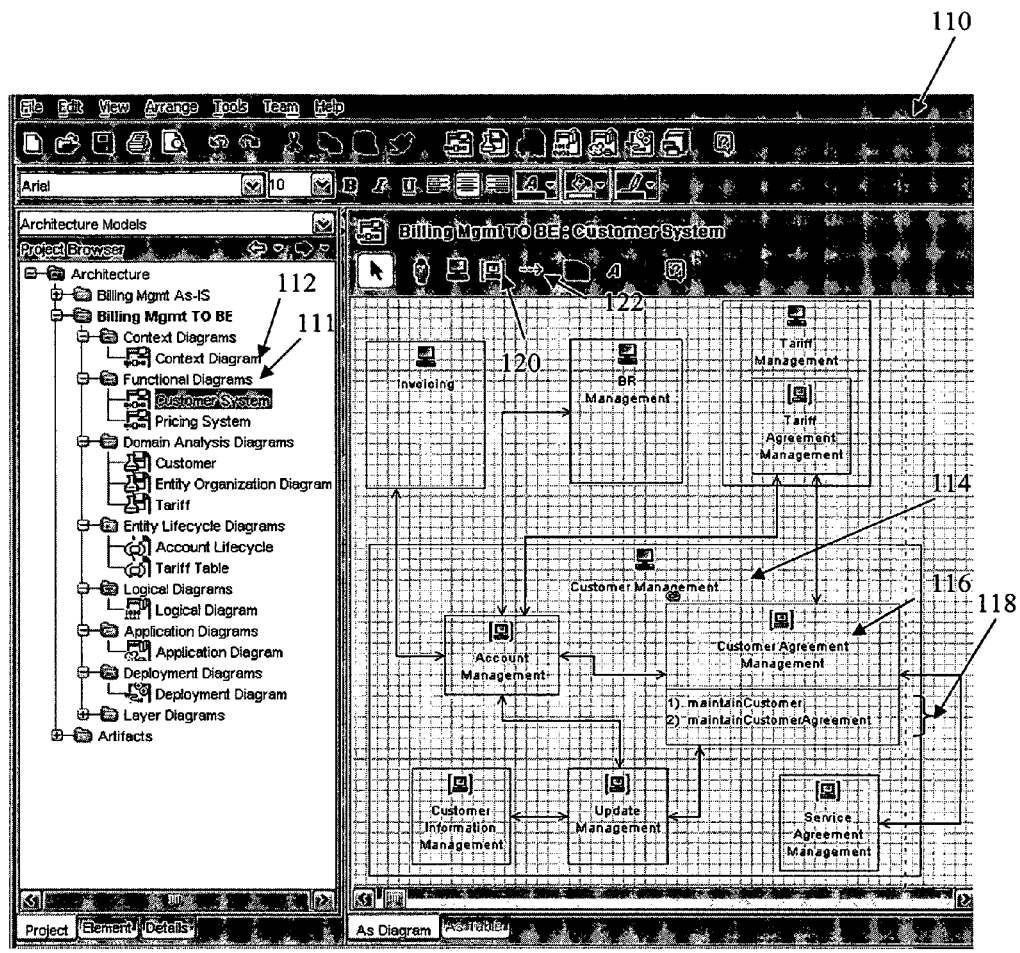
FIG. 5 is a block diagram illustrating an exemplary functional diagram (part of an exemplary computational viewpoint) used to generate the architecture of a business system in accordance with an embodiment.

FIG. 5 depicts an exemplary user interface 110 of the system that illustrates the functional diagram 111 of a sample business system. It should be noted that it is also possible to create a context diagram 112. In the example described earlier, these diagrams (111, 112) can belong to the computational viewpoint. The user interface 110 further illustrates an exemplary hierarchical decomposition that facilitates modeling a coarse grained functionality as a system and decomposing the functionality into a set of fine grained subsystems. By way of example, as depicted in FIG. 5, "Customer Management" 114 has a hierarchical relationship with the "Customer Agreement Management" 116 subsystem. Likewise, the concept of system and subsystem offering functional services is indicated with an exemplary example where "maintainCustomer" and "maintainCustomerAgreement" 118, are functional services offered by "Customer Agreement Management" subsystem. Such a modeling is possible through notations such as "System" 120, "Subsystem" 122 and "Functional Service" described earlier.

Figure 6:
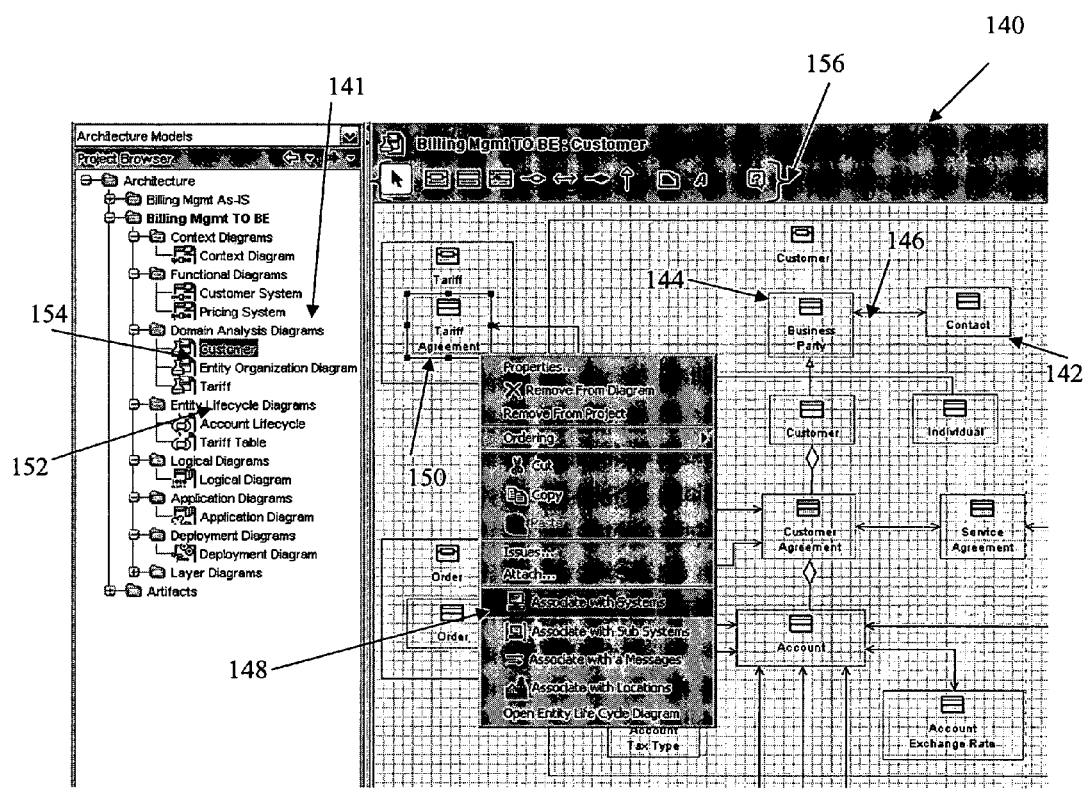
FIG. 6 is a block diagram illustrating an exemplary domain analysis diagram (part of an exemplary information viewpoint) used to generate the architecture of a business system in accordance with an embodiment.

FIG. 6 depicts an exemplary user interface 140 of the system illustrating a domain analysis diagram 141 of a sample business system. FIG. 6 illustrates the concept of "Domain Entity" and their relationships with "System" and "Subsystem". By way of an exemplary example, "Contact" 142 domain entity as depicted in FIG. 6, has a relationship with the "Business Party" 144. This is represented by 146. Similarly, as depicted in 148, the "Associate with Systems" option in the user interface 140 creates the relationship between the "Tariff Agreement" 150 domain entity with a "System" (not shown for clarity). It is also possible to create an Entity Lifecycle Diagram 152 and Entity Organization Diagram 154. As described earlier, these diagrams (141, 152, and 154) can belong to the information viewpoint. The reference numeral 156 depicts some sample notations for a domain analysis diagram.

Figure 7:
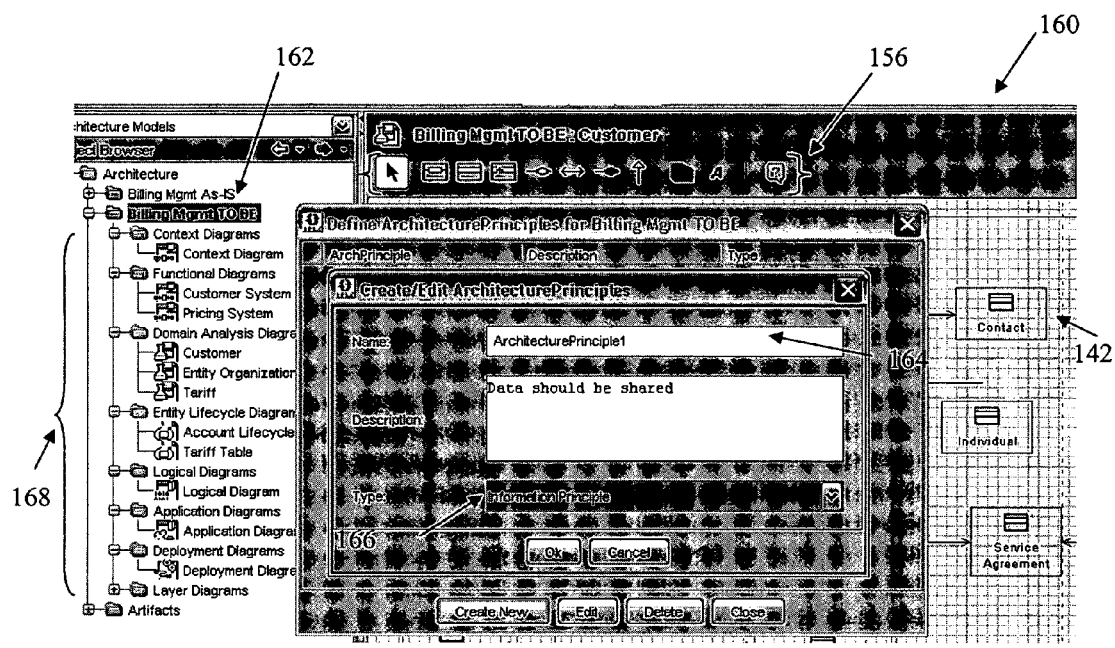
FIG. 7 is a block diagram illustrating an exemplary mechanism to capture an architecture principle used to generate the architecture of a business system in accordance with an aspect of an embodiment.

FIG. 7 depicts an exemplary user interface 160 of the system to capture an architecture principle associated with a business system "Billing Mgmt" 162. As illustrated in FIG. 7, the "ArchitecturePrinciple" 164 can be classified into various types 166. This exemplary example shows that the principle is of type "Information Principle". An architecture principle can be linked to the business system level, rather than at an individual diagram level 168.

Figure 8:
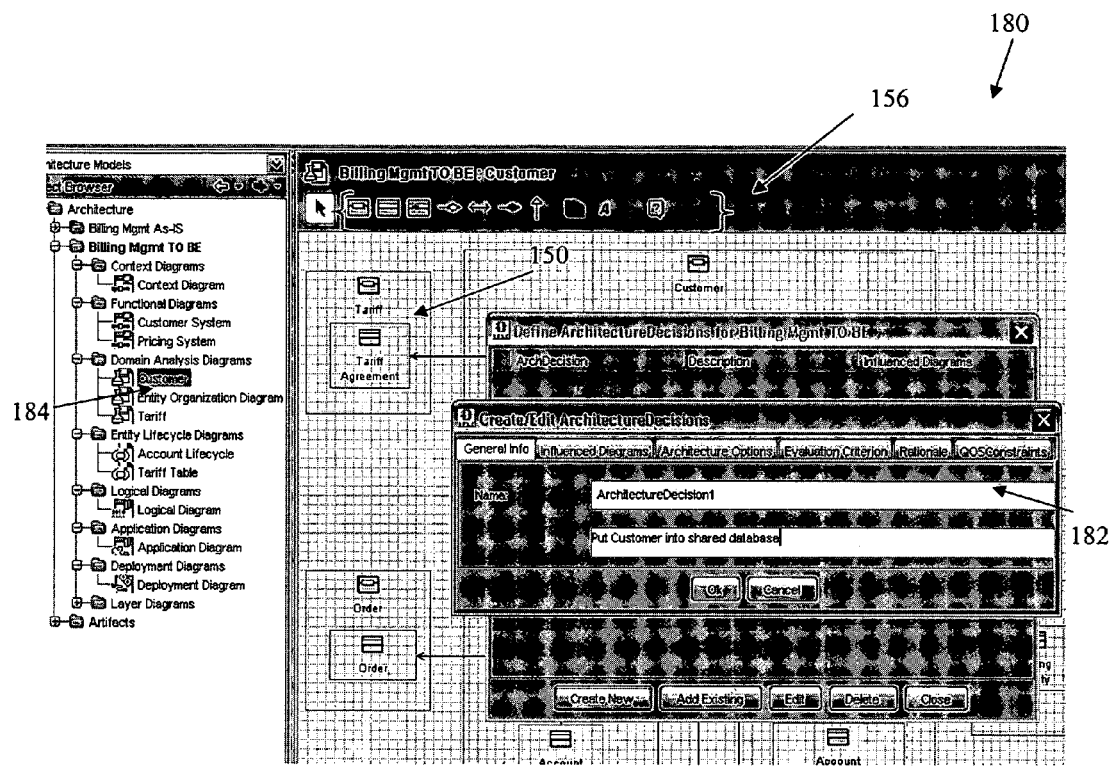
FIG. 8 is a block diagram illustrating an exemplary mechanism to capture a design rationale linked with at least one of a first plurality of view and viewpoint notations in accordance with an aspect of an embodiment.

FIG. 8 depicts an exemplary user interface 180 of the system to capture a design rationale. As described earlier, a design rationale can consist of at least one architecture decision which may be linked to a diagram or a specific notation. By way of an example, FIG. 8 illustrates that an architecture decision 182 has been linked to a domain entity "Customer" 184.

Figure 9:
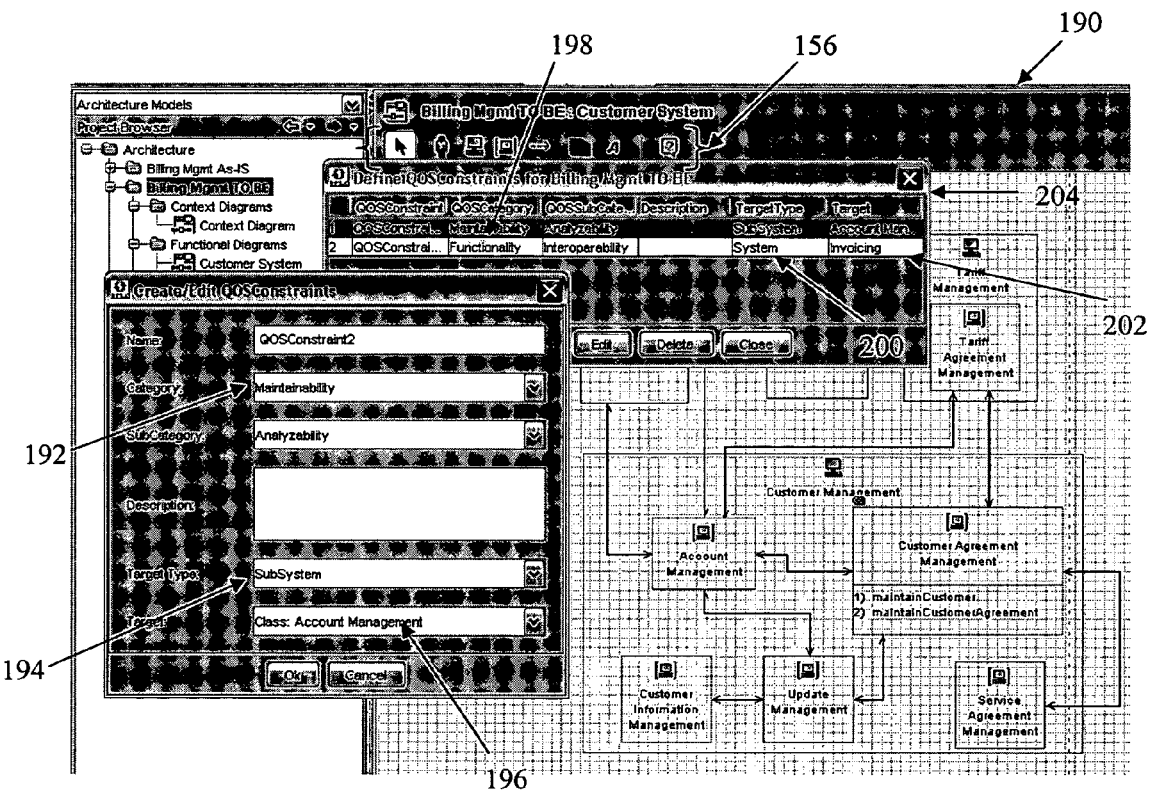
FIG. 9 is a block diagram illustrating an exemplary technique to link at least one quality of service (QoS) attribute with at least one of a first plurality of view and viewpoint notations in accordance with an aspect of an embodiment.

FIG. 9 depicts an exemplary user interface 190 of the system illustrating an exemplary technique to link at least one quality of service (QoS) attribute with at least one of a first plurality of view and viewpoint notations. By way of an example, FIG. 9 illustrates that the Maintainability QoS attribute 192 can be linked to a "Subsystem" 194—"Account Management" 196. Likewise, another QoS attribute "Functionality" 198 can be linked to a "System" 200—"Invoicing" 202 that has already been created. This is indicated generally using the block 204.

Figure 10:
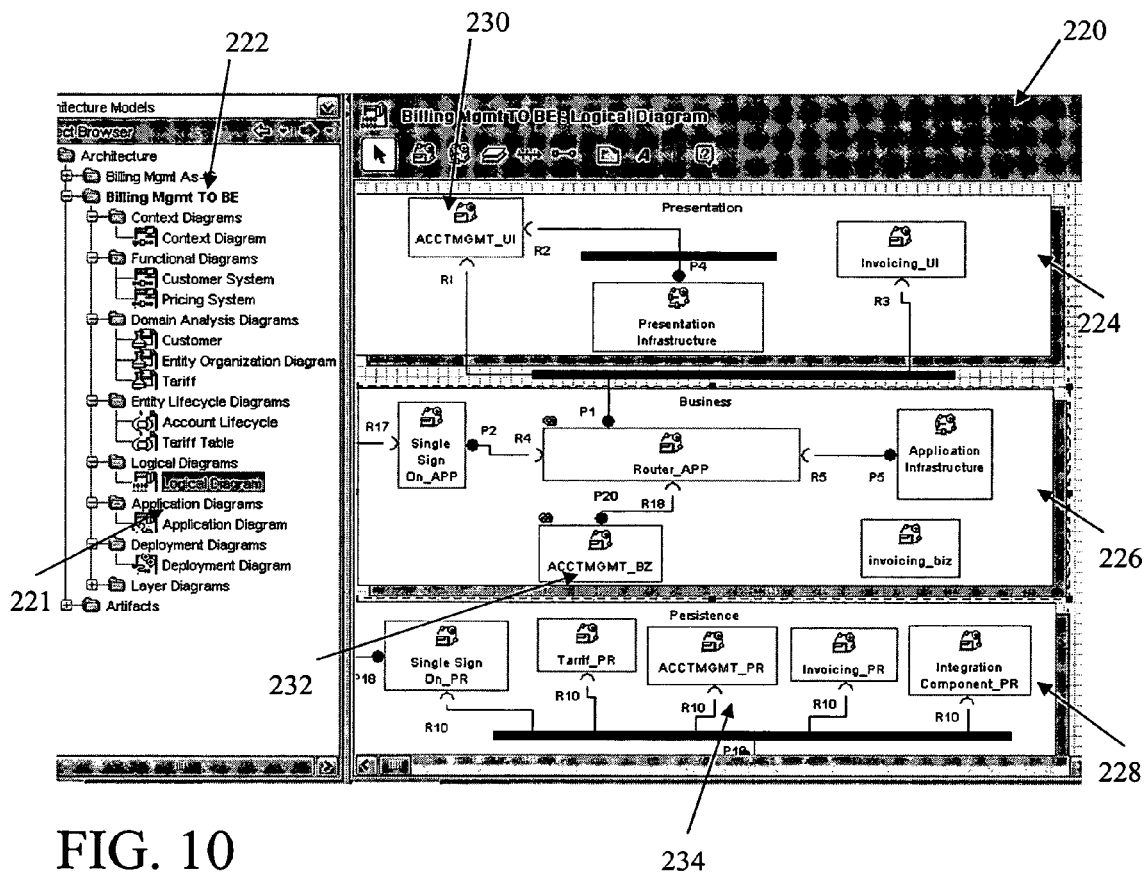
FIG. 10 is a block diagram illustrating an exemplary logical diagram (part of an exemplary engineering viewpoint) used to generate the architecture of a business system in accordance with an aspect of an embodiment.

FIG. 10 depicts an exemplary user interface 220 of the system illustrating an exemplary technique to describe a logical diagram 221. By way of an example, suppose that the "Billing Mgmt business system" 222 has been implemented as an internet application. FIG. 10 shows that the exemplary "Billing Mgmt business system" 222 consists of three tiers namely, presentation tier 224, business tier 226 and persistence tier 228. FIG. 10 shows that the "Account Management" Subsystem shown in FIG. 5 has been distributed across the three tiers. The presentation part (ACCMGMT_UI) 230 can be in the presentation tier 224, the business logic part (ACCMGMT_BZ) 232 can be in the business tier 226 and the data access part (ACCMGMT_PR) 234 can be in the persistence tier 228.

As will be appreciated by those of ordinary skill in the art, the foregoing example, demonstrations, and method steps can be implemented by suitable code on a processor based system, such as general purpose or special purpose computer. In such a system, the various software modules are desirably stored in memory and are accessed by the processor as required to carry out the process described herein as a computer implemented process. The processor based system desirably has a data input device such as a keyboard, touch screen or other input mechanism and a display. It should also be noted that different implementations of the present technique can perform some or all the steps described herein in different orders or substantially concurrently, that is, in parallel. Furthermore, the functions can be implemented in a variety of programming languages. Such code, as will be appreciated by those of ordinary skill in the art, can be stored or adapted for storage in one or more tangible machine readable media, such as on memory chips, local or remote hard disks, optical disks or other media, which can be accessed by a processor based system to execute the stored code. Note that the tangible media can comprise paper or another suitable medium upon which the instructions are printed. For instance, the instructions can be electronically captured via optical scanning of the paper or other medium, then compiled, interpreted or otherwise processed in a suitable manner if necessary, and then stored in a computer memory.

The sequence of instructions as explained in the method steps can include, but is not limited to, program code adapted for modeling a plurality of viewpoints adapted for describing the architecture of the business system in form of a collection of views and program code adapted for creating a software organization viewpoint that is adapted to provide a design framework for the architecture. The sequence of instructions can further include program code adapted for creating a first plurality of notations for each of the plurality of viewpoints for describing the plurality of viewpoints and program code adapted for creating a second plurality of notations for capturing design rationale indicative of the first plurality of notations. Furthermore, the sequence of instructions can include program code adapted for analyzing the software organization viewpoint and the plurality of viewpoints based on at least the second plurality of notations to generate the architecture of the business system.

In one embodiment of the present technique, the sequence of instructions can include program code adapted for monitoring performance of the business system after implementation of the architecture and to provide a modification of the architecture based on the performance. In another embodiment of the present technique, the sequence of instructions can also include program code adapted for simulating the architecture for integrating the business system. In yet another embodiment of the present technique, the sequence of instructions can include program code adapted for establishing requirements for design traceability of the plurality of viewpoints and program code adapted for providing modeling notations adapted to generate a relationship among the plurality of viewpoints. Further, the sequence of instructions can also include program code adapted for arriving at an architecture analysis reports and program code adapted for expressing software organization viewpoints.

As will be appreciated by a person skilled in the art, the various implementations provide a variety of advantages. Some of the advantages found in different implementations can include one or more of the following advantages. For example, the system reduces hand-off time to a design team by creating formalized deliverables and a common vocabulary. In addition to this, the system reduces hand-off time from a requirements team by creating traceability to requirements and common vocabulary. Further, the present system can improve deliverable quality by the comprehensiveness of the architecture description and by providing for the creation of better impact analysis by generating requirements-architecture-design traceability. Moreover, the system reduces architecture time by providing reference architectures and also improves deliverable quality by providing for verifiability of the architecture against functional and non-functional requirements through analysis of a formal model.

The description herein is presented to enable a person of ordinary skill in the art to make and use the embodiments disclosed herein in the context of the requirement for a obtaining a patent. The present description includes the best presently-contemplated embodiments known by the inventors for carrying out the present invention. Various modifications to the disclosed embodiments will be readily apparent to those skilled in the art. The principles of the present disclosure can be applied to other embodiments, and features of the disclosed embodiment can be used without the corresponding use of other features. Accordingly, the present invention is not intended to be limited to the embodiments shown and described herein, but is to be accorded the widest scope consistent with the principles and features described herein.

Many modifications of the present invention will be apparent to those skilled in the arts to which the present invention applies. Further, it can be desirable to use some of the features of the present invention without the corresponding use of other features.

Accordingly, the foregoing description should be considered as merely illustrative of the principles of the present invention and not in limitation thereof.

The invention claimed is:

1. A computer implemented method for generating an architecture for a business system, comprising:
    modeling a plurality of viewpoints adapted for describing the architecture of the business system as a collection of a plurality of diagrams, wherein at least one of the plurality of viewpoints is a software organization viewpoint adapted for providing a design framework for the architecture that describes how the business system is to be implemented by software developers;
    wherein the software organization viewpoint comprises (a)-(b):
        (a) at least one package diagram that comprises a decomposition of components of the business system into package units arranged in a layered stack, the package units representing specifically functional software; and
        (b) at least one load-build configuration diagram that provides inputs for designing a load-build structure, wherein the at least one load-build configuration diagram links deployable units of the business system with the package units that comprise the deployable units;
    storing a first plurality of notations for describing the plurality of diagrams;
    storing a second plurality of notations for capturing design rationale indicative of the first plurality of notations;
    establishing requirement-to-design traceability associating design rationale with at least one of the plurality of diagrams;
    storing a third plurality of notations for quality of service attributes capturing quality of service requirements, wherein at least one of the quality of service attributes is associated with at least one of the first plurality of notations describing the plurality of diagrams;
    establishing requirement-to-design traceability mapping a quality of service attribute to one or more of the plurality of diagrams; and
    generating the architecture of the business system using at least the plurality of diagrams while maintaining requirement-to-design traceability for one or more of the plurality of viewpoints in the architecture of the business system.

2. The method as recited in claim 1, wherein the business system comprises a plurality of sub systems, each having an association with the business system or other sub-systems.

3. The method as recited in claim 1, further comprising expressing a computational viewpoint through at least one of a context diagram or functional diagram or combinations thereof.

4. The method as recited in claim 1, further comprising expressing an information viewpoint through at least one of a domain analysis diagram, or entity organization diagram or entity lifecycle diagram or combinations thereof.

5. The method as recited in claim 1, further comprising expressing an engineering viewpoint through a logical diagram.

6. The method as recited in claim 1, further comprising expressing a technology viewpoint through at least one of an application diagram or deployment diagram or combinations thereof.

7. The method as recited in claim 1, further comprising generating at least one report pertaining to the architecture using a report generation module.

8. The method as recited in claim 1, further comprising providing modeling notations to generate a relationship among the plurality of viewpoints.

9. The method as recited in claim 1, further comprising generating the architecture via an user interface.

10. The method as recited in claim 1, further comprising describing at least one architecture related information of the business system using a meta-model.

11. Tangible machine readable media comprising memory or a hard disk containing computer executable instructions for implementing a computer implemented method for generating an architecture for a business system, the method comprising:

modeling a plurality of viewpoints adapted for describing the architecture of the business system as a collection of a plurality of diagrams, wherein at least one of the plurality of viewpoints is a software organization viewpoint adapted for providing a design framework for the architecture;

wherein the software organization viewpoint comprises (a)-(b):
  (a) at least one package diagram that comprises a decomposition of components of the business system into package units arranged in a layered stack, the package units representing specifically functional software; and
  (b) at least one load-build configuration diagram that provides inputs for designing a load-build structure, wherein at least one load-build configuration diagram links deployable units of the business system with the package units that comprise the deployable units;

storing a first plurality of notations for describing the plurality of diagrams;

storing a second plurality of notations for capturing design rationale indicative of the first plurality of notations;

establishing requirement-to-design traceability associating design rationale with one or more of the plurality of diagrams;

storing a third plurality of notations for quality of service attributes capturing quality of service requirements, wherein at least one of the quality of service attributes is associated with at least one of the first plurality of notations describing the plurality of diagrams;

establishing requirement-to-design traceability mapping a quality of service attribute to at least one of the plurality of diagrams; and generating the architecture of the business system using at least the plurality of diagrams while maintaining requirement-to-design traceability for one or more of the plurality of viewpoints in the architecture of the business system.

12. A computer system comprising at least one processor, wherein the computer system is programmed with computer implemented instructions for generating and analyzing an architecture for a business system, the computer implemented instructions comprising:
  a user interface module adapted for capturing input from at least one user of the business system;
  a view and viewpoint module adapted for modeling a plurality of viewpoints, wherein the plurality of viewpoints are modeled as a collection of a plurality of diagrams adapted for describing the architecture of the business system;
  a software organization module adapted for modeling a software organization viewpoint;
  wherein the software organization viewpoint comprises (a)-(b):
    (a) at least one package diagram that comprises a decomposition of components of the business system into package units arranged in a layered stack, the package units representing specifically functional software; and
    (b) at least one load-build configuration diagram that provides inputs for designing a load-build structure, wherein the at least one load-build configuration diagram links deployable units of the business system with the package units that comprise the deployable units;
  a first notation module adapted for creating a first plurality of notations for describing the plurality of diagrams;
  a second notation module adapted for creating a second plurality of notations for capturing design rationale indicative of the first plurality of notations;
  a viewpoint traceability module adapted for establishing requirement-to-design traceability associating design rationale with at least one of the plurality of diagrams;
  a third notation module adapted for storing a third plurality of notations for quality of service attributes capturing quality of service requirements, wherein at least one of the quality of service attributes is associated with at least one of the first plurality of notations describing the plurality of diagrams;
  a module adapted for establishing requirement-to-design traceability mapping a quality of service attribute to one or more of the plurality of diagrams; and
  a storage module adapted for retrieving output from at least the view and viewpoint module to generate the architecture of the business system while maintaining requirement-to-design traceability for one or more of the plurality of viewpoints in the architecture of the business system.

13. The system as recited in claim 12, wherein the storage module is further adapted for storing the output from at least the view and viewpoint module.

14. The system as recited in claim 12, further comprising a pattern management module adapted for reusing the plurality of viewpoints from a previously implemented architecture.

15. The system as recited in claim 12, wherein the viewpoint traceability module establishes traceability among requirements, the plurality of viewpoints, and the architecture of the business system.

16. The system as recited in claim 12, further comprising a report generation module adapted to generate an architecture document and a plurality of traceability analysis reports during implementation of the architecture.

17. A method of generating an architecture for a business system, the method comprising:
  modeling a computational viewpoint of the business system as a computational diagram, wherein the computational diagram represents functional decomposition of the business system into a set of functional elements that interact as interfaces;
  modeling an information viewpoint of the business system as an information diagram, wherein the information diagram represents kinds of information handled by the business system and constraints on use and interpretation of information;
  modeling an engineering viewpoint of the business system as an engineering diagram, wherein the engineering diagram represents how the business system is implemented and infrastructure required to support system distribution;
  modeling a technology viewpoint of the business system as a technology diagram, wherein the technology diagram represents software products and hardware components;
  modeling a software organization viewpoint of the business system, wherein the software organization viewpoint represents how the business system will be implemented by software developers;
  wherein the software organization viewpoint comprises (a)-(b):
    (a) at least one package diagram that comprises a decomposition of components of the business system into package units arranged in a layered stack, the package units representing specifically functional software; and (b) at least one load-build configuration diagram that provides inputs for designing a load-build structure, wherein the at least one load-build configuration diagram links deployable units of the business system with the package units that comprise the deployable units;

representing requirement-to-design traceability, wherein the requirement-to-design traceability comprises an association between a design rationale and at least one of any one or more of the diagrams;

representing viewpoint traceability by creating relationships among any one or more of the viewpoints and any one or more of the diagrams, wherein the viewpoint traceability maintains at least a relationship between an information element and a functional element using a Create-Read-Update-Delete relationship, and the relationship captures influence the functional element has on lifecycle of a business concept; and generating, by a computer, an architectural description of the business system using the computational diagram, the information diagram, the engineering diagram, the technology diagram, and the software organization viewpoint, wherein the generating preserves the requirement-to-design traceability, and requirement-to-design traceability is achieved at least in part in the architectural description of the business system by maintaining the relationship between the information element and the functional element using the Create-Read-Update-Delete relationship as part of the view point traceability, and the relationship captures influence the functional element has on lifecycle of the business concept, whereby the architectural description is stored in a non-volatile storage medium.

* * * * *

UNITED STATES PATENT AND TRADEMARK OFFICE
CERTIFICATE OF CORRECTION

| | | |
|---|---|---|
| PATENT NO. | : 7,716,254 B2 | Page 1 of 1 |
| APPLICATION NO. | : 11/224914 | |
| DATED | : May 11, 2010 | |
| INVENTOR(S) | : Sarkar et al. | |

It is certified that error appears in the above-identified patent and that said Letters Patent is hereby corrected as shown below:

Title Page, Item (56)

In Other Publications, Page 2, Col. 2, line 20, "Krutchen" should read --Kruchten--.

In the Specification

Col. 5, line 22-23, "the scratch" should read --scratch--.
Col. 5, line 52, "ten" should read --the--.
Col. 5, line 62, "has" should read --have--.
Col. 7, line 11-12, "a modeling elements" should read --modeling elements--.
Col. 9, line 50, "Microsoft NET" should read --Microsoft .NET--.
Col. 10, line 34, "removal them" should read --remove them--.
Col. 13, line 38, "describes" should read --describe--.
Col. 14, line 40, "units, the" should read --units; the--.
Col. 17, line 15-16, "an architecture analysis reports" should read --an architecture analysis report--.
Col. 17, lines 37-38, "a obtaining a patent" should read --obtaining a patent--.

In the Claims

Col. 18, line 35, "sub systems," should read --subsystems,--.
Col. 18, line 36, "sub systems" should read --subsystems--.
Col. 22, line 11, "view point" should read --viewpoint--.

Signed and Sealed this
Twenty-eighth Day of June, 2011

David J. Kappos
*Director of the United States Patent and Trademark Office*